May 31, 1949.  S. MATZNER  2,471,576
COMPOSITE ORNAMENTAL STRIP
Filed May 18, 1946  2 Sheets-Sheet 1
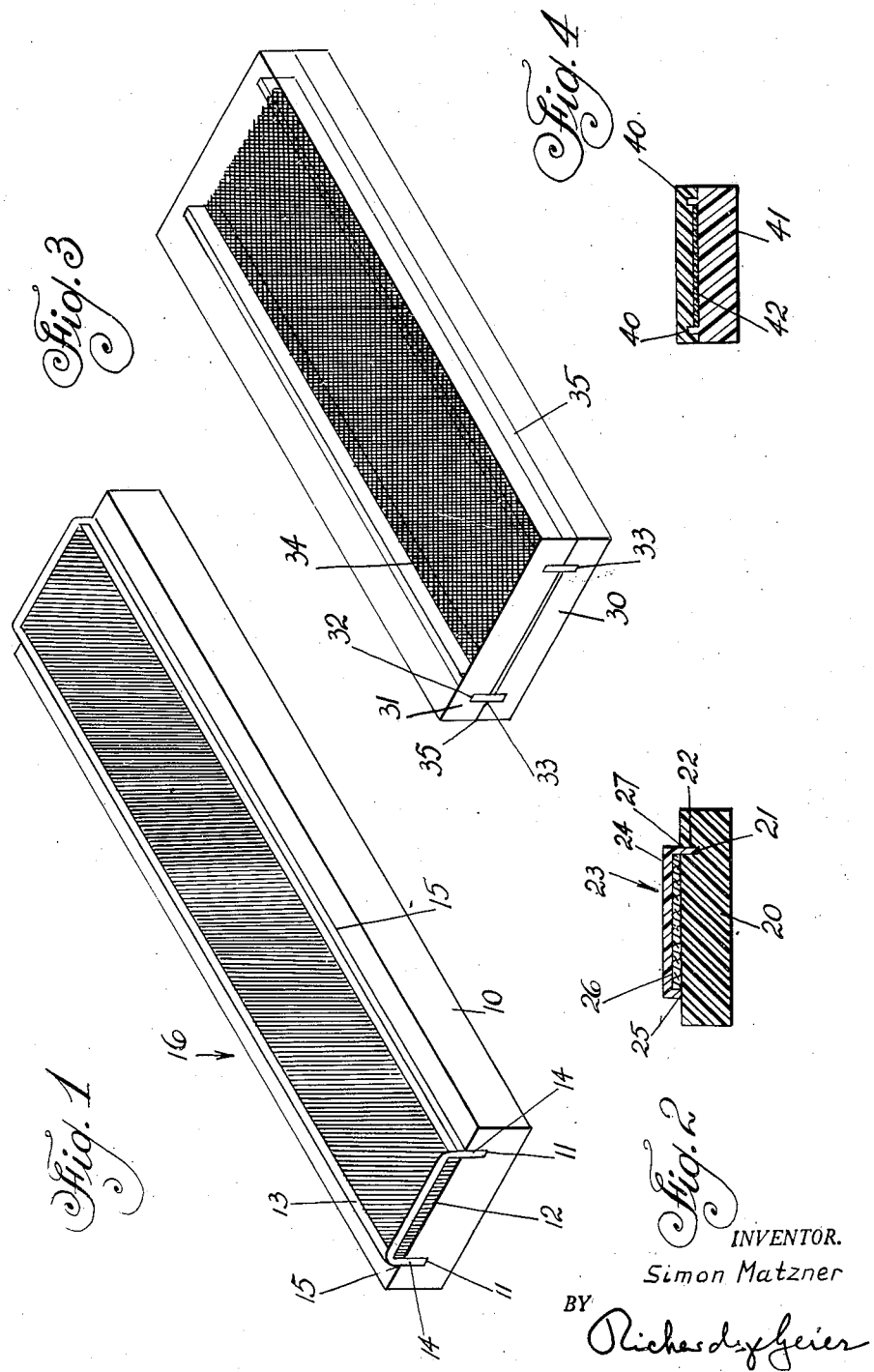
INVENTOR.
Simon Matzner
BY
Richards & Geier
ATTORNEYS May 31, 1949.　　　　S. MATZNER　　　　2,471,576
COMPOSITE ORNAMENTAL STRIP
Filed May 18, 1946　　　　　　　　　　　　2 Sheets-Sheet 2
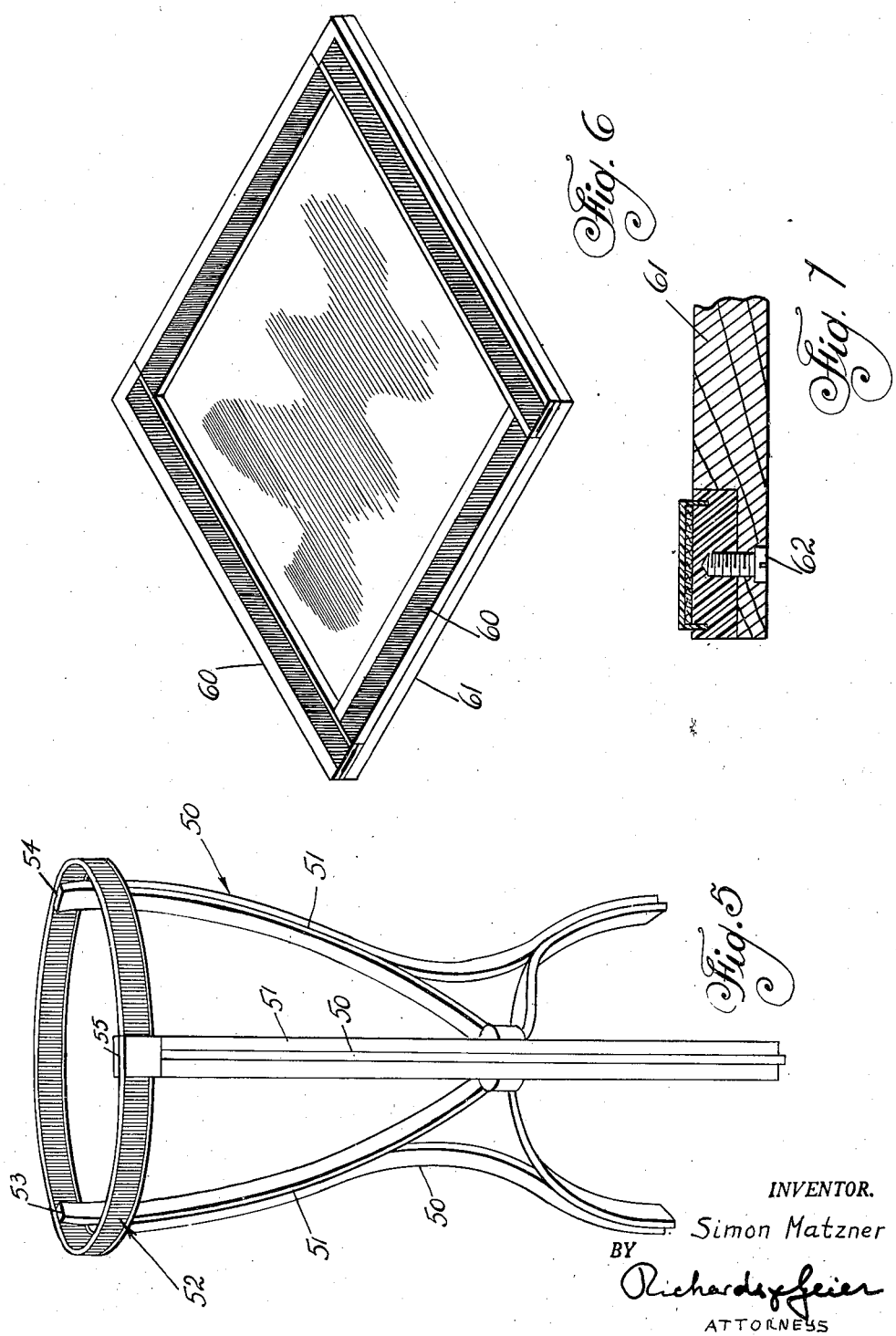
INVENTOR.
Simon Matzner
BY
ATTORNEYS Patented May 31, 1949

2,471,576

UNITED STATES PATENT OFFICE 2,471,576

COMPOSITE ORNAMENTAL STRIP

Simon Matzner, New York, N. Y.

Application May 18, 1946, Serial No. 670,812

3 Claims. (Cl. 41—21)

This invention relates to articles made of transparent plastic and more particularly to a method and means for enhancing the appearance of such articles.

At the present time, articles made of transparent plastic material have a cold appearance when uncolored. Even when colored little, outside of gaudiness, is added, and articles made of such colored plastic lack the appearance of refinement.

It is therefore an object of the present invention to provide a method and means for so ornamenting transparent plastic articles which will greatly enhance their appearance, so much so, that instead of the present cold, dull, dead-like appearance such articles will have a truly artistic and refined appearance.

Another object of the invention is to provide composite bars or the like comprising transparent plastic material members between which there is maintained an ornamental strip of either lace, fabric, or metal, the said strips being adapted to be shaped or formed into decorative borders for various articles of furniture or into component parts of such furniture.

A further object of the invention is to provide means for sealing the decorative element between the plastic members which will prevent such decorative element from becoming adversely affected by the solvent used in the sealing operation and to protect same against deterioration due to atmospheric conditions.

A still further object of the invention is to provide such transparent plastic decorative member, the use of which will open a new field of industry.

Other objects and advantages will appear as the nature of the improvements is better understood, the invention consisting substantially in the novel arrangement and co-relation of parts herein fully described, and illustrated in the accompanying drawings, wherein similar reference characters are used to denote corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative rather than a restrictive standpoint.

In carrying out one form of the invention it was found advantageous to provide ornamented strips, said strips comprising upper and lower transparent plastic members suitably joined together and having interposed between them a strip of any desired decorative material, the said ornamental strips being suitable for bending and cutting into any desired shape for a variety of purposes too numerous to enumerate here.

In the drawings:

Figure 1 is a perspective view showing a portion of an ornamental transparent plastic bar or strip made in accordance with one form of the invention;

Figure 2 is a cross sectional view of another form of the invention;

Figure 3 is a similar view to Figure 1 of a still another form of bar;

Figure 4 is a cross sectional view of yet another form of the invention;

Figure 5 is a perspective view of a table frame, showing one application of the ornamental bar;

Figure 6 is a perspective view of a table top showing another application of the bar of the present invention; and Figure 7 is a fragmental sectional view showing one manner of removably securing the ornamental bar to a table top or the like.

Referring now to the drawings in detail, the device shown in Figure 1 comprises a base member 10 preferably made of transparent plastic bar and has a pair of spaced apart depressions or grooves 11, which extend the entire length of the said bar or base member. Overlying the top surface of the base member 10, intermediate the grooves 11, there is a fabric strip 12 which is shown as being of a red color and held in place by a transparent plastic channel shaped cover 13 whose side walls or legs 14 extend into the grooves 11. The said channel 13 is permanently secured to the base 10 by applying a solvent by means of a brush or the like, along the lines or seams 15.

The length of the decorative bar or sheath 16 thus formed may be of any desired dimensions, depending upon the use to which it is put, and instead of having a fabric insert 12, may, if desired, have an insert made of base or precious metal, either of a plain or ornamental surface, or it may be made of a suitable filigree. If desirable, the said insert may comprise a highly decorative lace strip or the like. All of the inserts may be of any suitable single color or combination of colors.

It will be seen that the channel legs 14 form insulating walls to prevent any of the solvent from seeping through to the insert and in any way harming or partially destroying same. The solvent used for uniting, sealing or cementing the cover to the base may comprise acetic acid, acetone or some other suitable product. Inasmuch as such solvents are known to have a deleterious effect on fabrics or metals when brought in bodily contact with same, it is imperative that effective means such as the channel legs 14 be used to insulate the said inserts from the seal line 15. Not only does the channel 13 prevent contact between the insert and solvent, but seals the insert and insulates same from coming in contact with the atmosphere and thus prevents the collection of dust, fading and corrosion of said inserts.

In Figure 2, there is shown a form of the invention wherein instead of providing the base with a pair of spaced apart grooves and using a channel cover or sealing closure, the base 20 is provided with a single longitudinal groove 21, into which fits the leg 22 of a substantially L-shaped closure member or cover 23 the fabric overlying wall 24 of which is provided with a shallow flange 25 between which and the leg 22 the insert 26 is maintained. The said L-shaped cover or closure is cemented to the base 20 along a seam 27 formed at the juncture of the said leg and top surface of the base.

In Figure 3 the device is shown as comprising a lower transparent plastic bar 30 and a similar upper bar 31, each of which is provided with a pair of grooves 32, the grooves of one bar being in alignment with the grooves of the other bar and providing means for the reception of long keys or tongues 33 between the inner side surfaces of which a substantially thin lace insert 34 is maintained. The two bars 30 and 31 are cemented together along lines or seams 35, the keys 33 preventing the cementing solvent from reaching the insert 34.

In Figure 4, spaced apart tongues 40 on the base 41 form reception means for the insert 42 and insulating means to prevent the cementing solvent from reaching said insert.

In Figure 5, there is shown one of the many uses to which the ornamental device of the present invention can be put. In said Figure 5, there is shown the frame work 50 of a table, said frame work being made of transparent plastic or "Lucite" and comprising three legs 51, which carry at their upper ends an annular apron 52 which may be formed from a single length of ornamental bar of the present invention or of three such sections connected together at 53, 54 and 55.

It is to be understood that if desirable, the legs 51 may have the ornamental strips applied to them, either alone or in combination with the table top apron.

In Figure 6, there is shown another use to which the present invention may be put. In said figure, four ornamental strips 60 are shown as secured to the edges of a table top 61 to form a decorative border therefor. The said border may be flush with the table top or it may form a molding or ledge therefor, as shown. The ornamental members may be permanently secured to the table top or as shown in Figure 7 they may be removably secured by screws 62 to a wooden or other table top 61. The removable feature of the ornamental bars enables the owner to change said bars with every change of draperies, bedspreads or the like.

There are numerous other uses to which the present invention may be put as for example, in the manufacturing of picture frames, inlays for other household articles, etc., etc.

From the foregoing, it will be seen that the uses to which the present invention may be put are so numerous that the production of same will set up a vast new field of endeavor which may give employment to untold thousands.

What is claimed is:

1. As an article of manufacture, a composite ornamental strip comprising in combination a base having a pair of spaced apart parallel grooves extending longitudinally thereof, a non-plastic decorative strip superposed over the base intermediate the grooves, and a transparent channel shaped cover, the sides of which extend into the said grooves, the said cover being secured to the base.

2. As an article of manufacture, a composite ornamental strip comprising in combination a base having a pair of spaced apart grooves extending longitudinally thereof, a decorative strip superposed over the base intermediate the grooves, a transparent channel shaped cover, the sides of which extend into the said grooves, and a cemented seam at the juncture of the channel sides and top surface of the base, the said channel sides insulating the insert from the cement at the seams.

3. As an article of manufacture, a composite ornamental strip comprising in combination, a pair of transparent plastic members in superposed relation one to the other, a decorative non-plastic insert interposed between the said plastic members, each of the said members having a pair of spaced apart longitudinally extending grooves, the grooves in one member being in registry with grooves in the other member, a tongue in each pair of opposed grooves, the said tongues and grooves being positioned along the side edges of the insert as and for the purpose specified, the said members being cemented to each other along their sides.

SIMON MATZNER.

REFERENCES CITED

The following references are of record in the file of this patent:

UNITED STATES PATENTS

| Number | Name | Date |
|---|---|---|
| 1,534,684 | Chilson | Apr. 21, 1925 |
| 1,778,726 | Pappert | Oct. 21, 1930 |
| 1,929,368 | Snell | Oct. 3, 1933 |
| 2,081,538 | Hoarle | May 25, 1937 |
| 2,330,497 | Larmour | Sept. 28, 1943 |

OTHER REFERENCES

"Scientific American," vol. 161 of October 1939, page 217.